March 3, 1964 M. L. JONES 3,123,219
AUTO GLOVE COMPARTMENT RACK
Filed Oct. 4, 1962
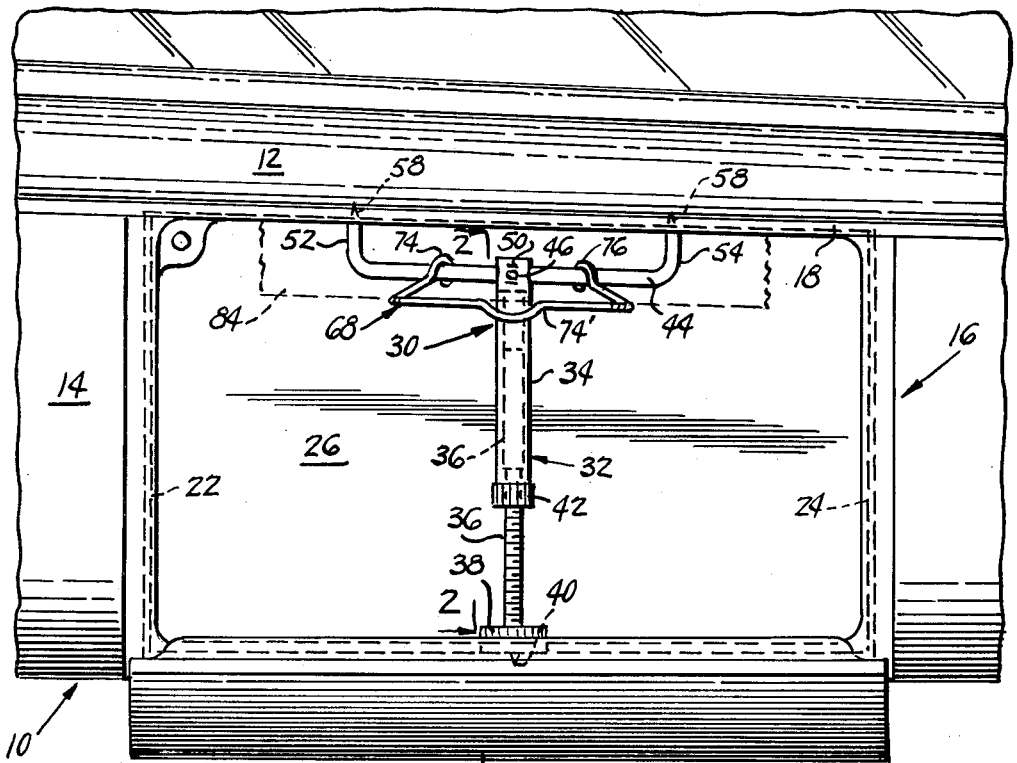
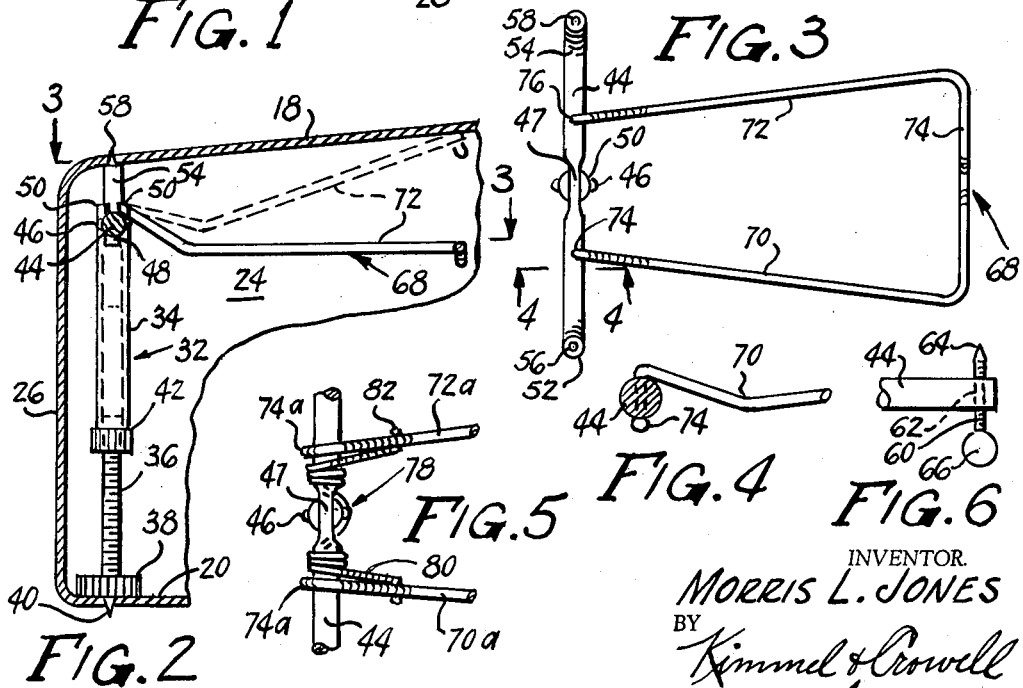
INVENTOR.
MORRIS L. JONES
BY Kimmel & Crowell
ATTORNEYS.

United States Patent Office 3,123,219
Patented Mar. 3, 1964

3,123,219
AUTO GLOVE COMPARTMENT RACK
Morris L. Jones, Rte. 4, Box 17, Harrisburg, Nebr.
Filed Oct. 4, 1962, Ser. No. 228,382
8 Claims. (Cl. 211—51)

This invention relates to an adjustable rack and relates more particularly to a rack for use in an automobile glove compartment to retain maps and the like in a position remote from the bottom of the glove compartment.

It is well known that most automobile glove compartments are used to contain a plurality of items varying from road maps through writing implements, pads of paper and small hand tools such as screwdrivers and pliers. This paraphernalia often causes a glove compartment to be cluttered and makes it difficult for the automobile operator or occupants to quickly and easily withdraw what they desire. Moreover, the items made of paper or the like such as the maps and the pads will often be torn, soiled or otherwise deleteriously affected by the tools and writing implements.

It is an object of this invention to provide an adjustable rack for an automobile glove compartment or the like which will retain paper items remote from tools and other implements which might tend to damage the former.

Another object of this invention is the provision of a rack of the type described which will releasably retain such easily damaged items against the top wall of the glove compartment.

A further object of this invention is to provide such an adjustable rack which will be easily affixed to glove compartments in automobiles of any particular size or shape.

A still further object of the instant invention is to provide such a device having means to fixedly secure the same to the top and bottom of the glove compartment thereby rendering the device strong and sturdy.

Another object of this invention is to provide such a device which will be capable of being mounted in glove compartments having an angular top wall.

A still further object of the instant invention is the provision of an automobile glove compartment rack which is sturdy in construction and inexpensive to manufacture.

Other and further objects reside in the combination of elements, arrangement of parts and features of construction.

Still other objects will in part be obvious and in part be pointed out as the description of the instant invention proceeds and as shown in the accompanying drawing wherein there is disclosed preferred embodiments of this inventive concept.

In the drawing:

FIGURE 1 is a vertical elevational view of an adjustable rack in accordance with the instant invention as it would be positioned in an automobile glove compartment.

FIGURE 2 is a fragmentary cross sectional view taken along the line 2—2 in FIGURE 1.

FIGURE 3 is a top plan view of the rack of the instant invention taken along line 3—3 of FIGURE 2.

FIGURE 4 is a transverse cross sectional view taken along line 4—4 of FIGURE 3.

FIGURE 5 is a fragmentary plan view of a further embodiment of the instant invention.

FIGURE 6 is a fragmentary plan view of a further embodiment of the instant invention.

Similar reference characters refer to similar parts throughout the several views of the drawing.

Referring now to the drawing in detail and more particularly to FIG. 1, an automobile dashboard is shown generally at 10 having a cowl portion 12 and a front portion 14. A conventional glove compartment shown generally at 16 is comprised of a top wall 18, a bottom wall 20, two end walls 22 and 24, a back wall 26 and a pivotally mounted front door 28. The door 28 is shown open in FIG. 1 and rests in a substantially horizontal position.

Within the glove compartment 16 is shown the adjustable rack of the instant invention indicated generally by the reference numeral 30. A vertically extending supporting member 32 is formed of a tubular portion 34 having internal threads and a rod portion 36 externally threaded to telescope with said tubular portion 34. A roughened or knurled adjusting wheel 38 is fixed to the bottom end of the rod portion 36 of the supporting member 32. Secured to the bottom end of the adjusting wheel 38 is a pointed member 40 adapted to penetrate the bottom wall 20 of the glove compartment 16 to retain the supporting member 32 in fixed relation thereto. Note particularly FIGS. 1 and 2. A roughened or knurled collar 42 is formed at the bottom of the tubular portion 34 of the supporting member 32 in order to assist the user in vertically adjusting the supporting member 32 in a manner to be explained further hereinafter.

A substantially horizontally extending cross-bar 44 is mounted intermediate its ends at the top of the supporting member 32. Since many glove compartments have a slanting top wall 18 as shown in FIG. 1, it is preferable to pivotally mount the cross bar 44 by means of a pin 46 or the like. A reduced diameter portion 47 of the cross bar 44 is mounted in a transversely extending slot 48 forming a bifurcated member 50 adjacent the upper end of the tubular portion 34 of the supporting member 32. This will allow the cross bar 44 to be canted in accordance with the angularity of the top wall 18 of the glove compartment 16.

If the walls of the glove compartment are made of relatively soft material such as cardboard, the cross bar 44 may merely have its end portions bent to form vertically extending members 52 and 54, each having pointed ends 56 and 58 respectively as shown in FIGS. 1, 2 and 3. On vertically adjusting the supporting member 32 the pointed members 56, 58 and 40 will be forced into the top and bottom walls 18 and 20, respectively, of the glove compartment 16 thereby securing the adjustable rack against movement in any direction.

If the walls of the glove compartment are formed of a harder material such as plastic or sheet metal, the upwardly bent portions 52 and 54 and their associated pointed members 56 and 58 of the cross bar 44 are replaced by vertically extending thumb screws 60 such as shown in FIG. 6. Threaded bores are provided adjacent each end of the cross bar 44 such as is shown at 62 in FIG. 6 and thumb screws having a pointed upper end 64 and a thumb and finger engaging lower end 66 are inserted therein for securing the cross bar to the top wall 18 of a glove compartment 16.

A spring clip 68 is fixed to the cross bar 44 and extends toward the front door 28 of the glove compartment 16 as seen in FIGS. 1 and 2. The clip 68 is generally U-shaped having two arms 70 and 72 and a connecting portion 74. Note FIG. 3. The clip 68 may be formed of spring steel and the end portions 74 and 76 of the arms 70 and 72, respectively, may be downwardly bent and secured in vertically extending slots in the cross bar 44 as shown in detail in FIG. 4. The inherent flexibility of the spring steel will normally bias the clip 68 in an upward direction to the position shown in dashed lines in FIG. 2.

If the material to be held against the top wall 18 of the glove compartment 16 is particularly heavy, spring means may be added to the device of the instant invention to increase the upward bias of the clip 68. In FIG. 5 such spring means are shown at 78. It will be noted that in this form of the invention, the end portion 74a and 76a of the arms 70a and 72a circumscribe the cross bar 44 to pivotally mount the clip thereon. Spring means 78 coil around the cross bar 44 on either side of the pivot 46 and have end portions 80 and 82 underlying the arms 70a and 72a respectively, at points spaced from their end portions 74a and 76a. Thus the spring means 78 acts to constantly bias the clip 68 in an upward direction.

The use and operation of this device will now be apparent. The door 28 of the glove compartment 16 is opened in the manner shown in FIG. 1. The entire adjustable rack 30 is inserted through the opening to the rear of the compartment and the supporting member 32 is adjusted vertically by means of the telescoping connection between the tubular portion 34 and the rod portion 36. If the embodiment of FIGURES 1–3 is used, the pointed members 56 and 58 on the upwardly projecting bent portions 52 and 54, respectively, of the cross bar 44 are pushed into the top wall 18 of the glove compartment 16. The supporting member 32 is then vertically adjusted by gripping the collar 42 of the tubular member 34 in one hand and turning the adjusting wheel 38 with the thumb and finger of the other hand until the pointed member 40 punctures the bottom wall 20 of the glove compartment 16.

If the modification shown in FIG. 6 is to be used the device is placed inside the glove compartment with the cross bar extending parallel to the top wall 18 thereof. the pointed ends 64 of the screw members 60 are then secured in said top wall 18 by turning the finger engaging portions 66 thereof. The vertical adjustment of the supporting member 32 is then similar to that mentioned hereinbefore.

The upwardly biased clip 68 can then be pivoted downwardly from the position in dashed lines to that shown in solid lines in FIG. 2 to insert a plurality of maps or the like indicated generally by the dashed lines 84 in FIG. 1. By releasing the clip 68 it will be resiliently urged in an upward direction by its inherent flexibility in the embodiment of FIGS. 1–4, or by the spring means 78 in the embodiment of FIG. 5 to releasably hold the material indicated at 84 against the top wall 18 of the glove compartment 16.

It will now be seen that there is herein provided a device which accomplishes all of the objects of this invention and others including many advantages of great practical utility and commercial importance.

It is to be understood that many embodiments may be made of this inventive concept and many modifications may be made of the embodiment herein shown and described without departing therefrom. For example, the tubular portion 34 of the supporting member 32 need not be internally threaded throughout its length. The knurled collar 42 could be a threaded nut press fit into the bottom of the tubular portion 34 to allow the rod portion 36 to be threaded thereinto. Also, the base of the tubular portion 34 could be crimped and threaded to allow adjustment of the supporting member 32. Other obvious expedients would be apparent to one with normal skill in the art to modify other portions of the adjustable rack 30 of the instant invention. Therefore, this disclosure is merely to be taken as illustrative and not in a limiting sense.

I claim:
1. An adjustable rack for use in a compartment having a top and bottom wall comprising a vertically extending adjustable supporting member having a top and a bottom end, a substantially horizontally extending crossbar having two ends, said cross bar being mounted intermediate its ends of the top end of said supporting member, means on said cross bar securing the same to the top wall of said compartment, means on the bottom of said supporting member securing the same to the bottom wall of said compartment and an upwardly biased clip secured to said cross bar.

2. An adjustable rack in accordance with claim 1 wherein said cross bar is pivotally mounted intermediate its ends on the top end of said supporting member.

3. An adjustable rack in accordance with claim 1 wherein said means on said cross bar securing the same to the top wall of said compartment includes upwardly bent portions adjacent each of said ends thereof and pointed members on the extremities of each of said bent portions.

4. An adjustable rack in accordance with claim 1 wherein said means on said cross bar securing the same to the top of said compartment includes means defining vertically extending threaded bores adjacent each of said ends thereof, a screw threadable into each of said bores, each of said screws having a pointed upward end and means adjacent its lower end to rotate each of said screws about its longitudinal axis.

5. An adjustable rack in accordance with claim 1 wherein said supporting member includes an internally threaded tubular portion, a corresponding externally threaded rod portion telescoping at its upper end into the lower end of said tubular portion and a pointed member at the lower end of said rod portion.

6. An adjustable rack in accordance with claim 5 wherein said tubular portion has means defining a horizontally extending slot at its upper end and said cross bar is pivotally mounted intermediate its ends in said slot.

7. An adjustable rack in accordance with claim 1 wherein said clip is U-shaped and is formed of spring steel, said U-shaped clip having two arms and a connecting portion, each of said arms having downwardly bent portions, means defining a vertically extending bore inwardly spaced from each end of said cross bar, one of said downwardly bent end portions fixed in each of said bores.

8. An adjustable rack in accordance with claim 1 wherein said clip is U-shaped and has two arms and a connecting portion, each of said arms having an end portion remote from said connecting portion circumscribing said cross bar to pivotally mount said clip thereon, and spring means resiliently contacting the underside of each of said arms at a point spaced from said end portions.

References Cited in the file of this patent
UNITED STATES PATENTS

| | | |
|---|---|---|
| 663,083 | Kolb | Dec. 4, 1900 |
| 2,196,945 | Shullaw | Apr. 9, 1940 |
| 2,215,208 | Burkhart | Sept. 17, 1940 |
| 2,635,761 | Purifoy | Apr. 21, 1953 |
| 3,058,595 | Jones | Oct. 16, 1962 |